Jan. 13, 1953             E. L. DICK             2,625,402
ADJUSTABLE TAP HOLDER
Filed May 12, 1950
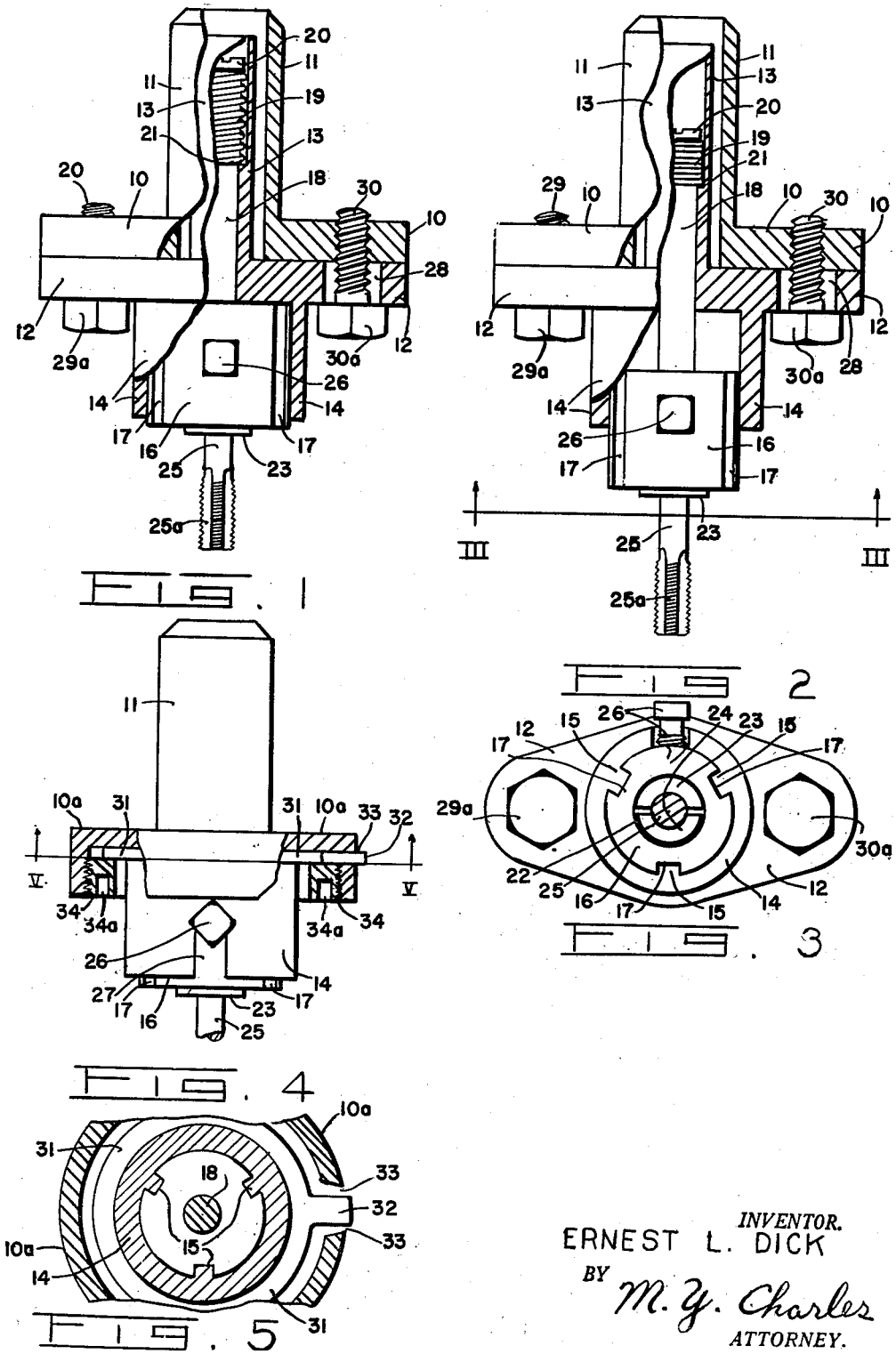
INVENTOR.
ERNEST L. DICK
BY *M. Y. Charles*
ATTORNEY.

Patented Jan. 13, 1953

2,625,402

UNITED STATES PATENT OFFICE 2,625,402

ADJUSTABLE TAP HOLDER

Ernest L. Dick, Wichita, Kans.

Application May 12, 1950, Serial No. 161,697

4 Claims. (Cl. 279—16)

This invention relates to an improvement in tool holders for turret types of lathes and similar machines. In machines of this kind it has been the practice to mount the tool on the turret and the machine will then move the work to engagement with the tool, or the tool to engagement with the work. It has been difficult to mount the tool in exact alignment with the work, and the movements of the machine do not always coincide with the exact movement required by the tool during its period of operation; this is true particularly when the tool is a thread or tap. This improved tool holder is designed to hold the tool and compensate for or overcome the above mentioned difficulties.

Now referring to the accompanying drawings in which similar numerals of reference designate the same parts throughout the several figures of the drawings:

Fig. 1 is a combination top plan and sectional view of the tool holder device, the view being shown in its contracted position.

Fig. 2 is a combination top plan and sectional view of the tool holder device, the device being shown in its extended position.

Fig. 3 is a front view of the tool holder device, the view being as seen from the line III—III in Fig. 2, and looking in the direction of the arrows.

Fig. 4 is a combination top plan and sectional view of a modified form of the tool holder device.

Fig. 5 is a cross sectional view of the modified form of the tool holder device, the view being as seen from the line V—V in Fig. 4 and looking in the direction of the arrows.

In the drawings the tool holder device is shown as being a substantially elliptical base element 10 that has a rearwardly extending tubular portion 11 integrally formed thereon and positioned in the center thereof.

The device is provided with a second substantially elliptical shaped plate 12 having the same size and proportions of the base plate 10 and is adapted to fit thereagainst. The plate 12 has a rearwardly extending tubular portion 13 that is integrally formed thereon and is positioned at the center thereof. The outside diameter of the tube 13 is considerably less than the inside diameter of the tubular element 11 and is therefore loosely and movably positioned within the tube 11. The plate 13 is also provided with a forwardly extending sleeve or cup-like element 14 that is integrally formed thereon and is in axial alignment with the tubular element 13. The inside of the sleeve 14 is provided with inwardly and longitudinally extending splines 15.

Slidable longitudinally within the sleeve 14 is positioned a chuck block 16 that is provided with longitudinally disposed grooves 17 in which the splines 15 are slidably received for the purpose of preventing revolving movement of the chuck block 16 in the sleeve 14. The chuck block 16 is provided with a rearwardly extending pin 18 that is in axial alignment with the chuck block 16 and is integrally formed thereon.

A helical compression spring 19 is positioned around the rear end of the pin 18 and is retained thereon by means of a screw that is threaded into the rear end of the pin 18 and the head 20 of the screw overlaps the rear end of the spring 19 to retain the spring on the rear end of the pin 18. The forward end of the spring 19 rests on an annular shoulder 21 that is formed in the inner central portion of the tube 13. The spring 19 serves to yieldably hold the chuck block and parts carried thereby in their retracted position in the sleeve 14. The chuck block 16 has an axially positioned bore 22 in the front end thereof in which is slidably received and positioned a pair of hollow half round chuck jaws 23 and 24 between which is received and held the tool shank 25, the tool shown is a thread tap 25a, and as set screw 26 is threaded through the chuck block 16 to engage the chuck jaw 23 and press or move it toward the chuck jaw 24 so as to rigidly bind and hold the tool shank 25 between the two chuck jaws 23 and 24. The sleeve 14 has a slot 27 therein that is open to the front of the sleeve 14 and extends rearwardly therefrom to receive the set screw 26 and permit slidable longitudinal movements of the set screw 26 in the slot 27 as will later be described.

The plate 12 has large holes such as shown at 28 in each end thereof and screws 29 and 30 are passed, one through each hole 28 and are threaded into the base plate 10 so that the heads 29a and 30a of the screws 29 and 30 will bear against the plate to rigidly bind and hold the plate 12 against and on the plate 10 in adjusted positions as will later be described.

The device may be prepared for use by first placing the tubular element 11 in a hole or slot in a turret head, not shown, and positioning the device therein as in a selected position and rigidly fixing the tool holder therein by means of a set screw, not shown, in the manner that such tools are usually set, or if desired the tubular element 11 could be fixed in the chuck or tail stock of a lathe in the same manner any work would be placed therein. This having been done the shank 25 of a desired tool such as a thread tap 25a is inserted between the chuck jaws 23 and 24 and the set screw 26 screwed down to tighten and rigidly hold the tool shank 25 between the chuck jaws 23 and 24. This having been done the screws or bolts 29 and 30 may be turned to loosen the plate 12 against the plate 10 whereupon the plate 12 and the elements carried thereby may be moved in a plane transverse the axis of the tool 25a to move and position the tool 25a in exact alignment with the work the tool is to act on.

The tool holder and tool having thus been prepared for use the tool 25a and the work, not shown, may be brought into engagement with each other for the purpose of threading the inner face of a hole in the work. In this operation the tool or the work may not be moved toward each other as fast as is required by the pitch of the threads being cut, therefore this discrepency is compensated for by the pull of the tool or the work toward each other, whereupon the chuck block 16 and tool 25a carried thereby will be pulled forward against the resisting pressure of the spring 19. Similar movements in reverse order will be effected when the turning movement of either the work or tool is reversed to withdraw the tool from the work.

In Figures 4 and 5 is shown a modified form of the device in which a cup-like element 10a is substituted for the base plate 10 in Figures 1 and 2, and the tubular element 11 is integrally formed on and is in axial alignment with the cup 10a. Within the tube 11 are all the parts 13, 18, 19 and 20 and 21 precisely the same as described in Figures 1 and 2, also the sleeve 14, chuck block 16, chuck jaws 23 and 24, set screw 26 and slot 27 are all the same as described in Figures 1, 2 and 3 except that the sleeve 14 is provided with an outwardly extending annular flange 31 therearound that is integrally formed thereon at the rear or base thereof and is adapted to rest on and against the inside face of the bottom of the cup 10a. The flange 31 is provided with an outwardly extending leg 32 that is loosely positioned in a hole 33 in the side wall of the cup 10a adjacent the bottom thereof. The flange 31 is considerably less in diameter than the inside diameter of the cup 10a, therefore the sleeve 14 can be moved to numerous positions and the axis thereof will always remain in parallelism with that of the tubular element 11. A sleeve 34 having holes 34a in the center edge thereof that is threaded within the inner face of the wall of the cup element 10a to engage and bear against the flange 31 whereby the sleeve 14 may be moved to selected positions for tool positioning the same as described for Figures 1, 2 and 3. This adjustment having been made the sleeve 34 may be tightly screwed against the flange 31 by means of a spanner wrench that may be placed in the holes 34a to hold the sleeve 14 and the parts it carries in their adjusted position. The leg 32 will prevent the sleeve 34 from turning in the cup 10a under the urge of the tool 25 in the process of the tool 25 doing its work.

While the device as shown and described is probably the preferred forms of the device it is to be understood that such modifications of the device may be employed as lie within the scope of the appended claims without departing from the spirit and intention of the invention. Now having fully shown and described my invention, what I claim is:

1. In a tool holder device of the kind described; a tool chuck and means for rigidly holding a tool in the chuck, a chuck holder and carriage therefor, said chuck being yieldably movable longitudinally and non-revolvable in said chuck holder, and means for adjusting and rigidly holding the said chuck holder in adjusted parallel positions about the center longitudinal axis of the said chuck holder carriage, and means on said carriage for the mounting of the carriage on a machine.

2. In a tool holder device of the kind described and as defined in claim 1; said chuck being movable outwardly from the said chuck holder by the pull of the tool held therein, and spring means for retracting the chuck as the pull of the tool is released.

3. In a tool holder of the kind described and as defined in claim 1; said carriage having a face plate and a tubular support extending rearwardly therefrom and being centrally positioned thereon, said chuck holder being a cup element and having a tubular element extending rearwardly therefrom and being positioned within the tubular element of said carriage, the outside diameter of the second said tubular element being considerably less than the inside diameter of the first said tubular element to permit radial adjustment movements of the second said tubular element within the first said tubular element, said chuck holder cup being engageable against the face plate of the said carriage to maintain parallelism between the center longitudinal axes of the first and second said tubular elements, said chuck having a rearwardly extending stem, slidably passing through the said cup and being slidably receivable in the second said tubular element, a spring positioned around the said stem of the chuck, one end of said spring resting on and being supported by a shoulder formed within the second said tubular element, and means carried by the rear end of said chuck stem and engaging the other end of said spring for the yieldable retracting movement of said chuck.

4. In a tool holder device of the kind described; a tool chuck and means for rigidly holding a tool in the chuck, a chuck holder and carriage therefor, said chuck being yieldably movable longitudinally and non-revolvable in said chuck holder, and means for adjusting and rigidly holding the said chuck holder in adjusted parallel positions about the center longitudinal axis of the said chuck holder carriage, and means on said carriage for the mounting of the carriage on a machine, said carriage having an annular face plate and a forwardly extending annular flange portion integrally formed thereon and having a passage through said flange, said chuck holder having an outwardly extending flange therearound and resting against the said face plate and having means thereon extending through the passage in the first said flange to prevent relative rotation between the said chuck holder and the said carriage, the outside diameter of the chuck holder flange being considerably less than the inside diameter of the carriage flange, a lock ring, said lock ring being threaded into the said carriage flange and engageable with the flange of the chuck holder, the inside diameter of said ring being considerably greater than the outside diameter of the chuck holder and means for turning said ring to lock and hold the chuck holder in radially adjusted positions relative to the face plate of the carriage.

ERNEST L. DICK.

REFERENCES CITED

The following references are of record in the file of this patent:

UNITED STATES PATENTS

| Number | Name | Date |
|---|---|---|
| 1,369,491 | Straehle | Feb. 22, 1921 |
| 1,377,663 | Brown et al. | May 10, 1921 |
| 1,702,810 | Buhr | Feb. 19, 1929 |
| 2,524,852 | Straun | Oct. 10, 1950 |

FOREIGN PATENTS

| Number | Country | Date |
|---|---|---|
| 106,736 | Great Britain | June 7, 1917 |